Aug. 11, 1953 T. THORSTEN 2,648,572
FLY ASH FEEDER
Filed Sept. 11, 1947 2 Sheets-Sheet 1

INVENTOR.
THORLEIF THORSTEN
BY
Christy, Parmelee & Strickland
ATTORNEYS

Aug. 11, 1953 T. THORSTEN 2,648,572
FLY ASH FEEDER
Filed Sept. 11, 1947 2 Sheets-Sheet 2
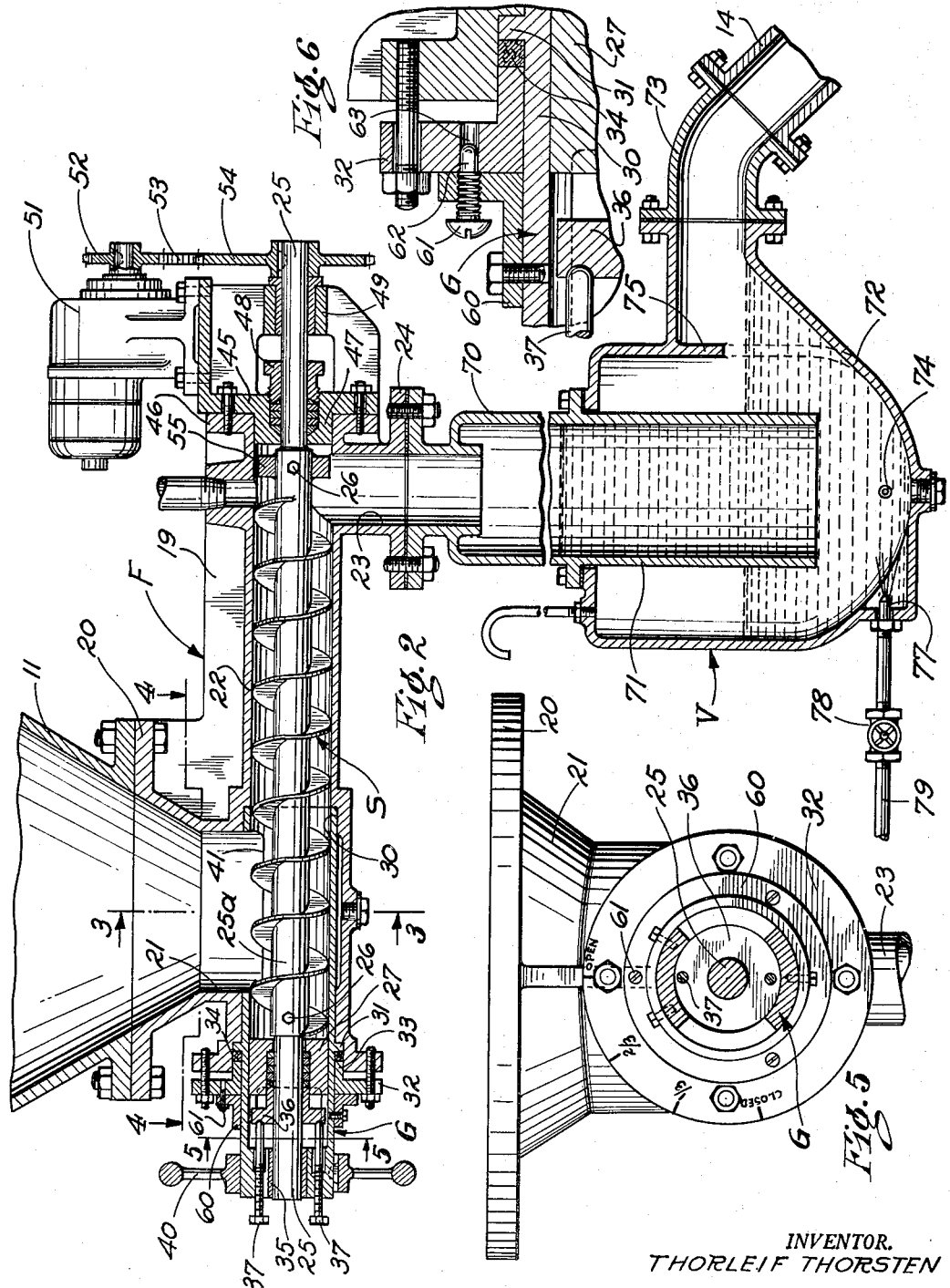
INVENTOR.
THORLEIF THORSTEN
BY
Christy, Parmelee & Struckhen
ATTORNEYS

UNITED STATES PATENT OFFICE 2,648,572

FLY ASH FEEDER

Thorleif Thorsten, Pittsburgh, Pa.; Marie E. Thorsten, executrix of said Thorleif Thorsten, deceased Application September 11, 1947, Serial No. 773,383

16 Claims. (Cl. 302—15)

This invention relates to the handling of finely divided solid particles such as fly ash, flue dust, and other particles of like properties, and to a system for handling the same, and has particular application to the handling of such particles where there may be a pressure differential between parts of the system against which a seal must be provided.

The invention is especially useful in connection with the operation of large boilers where electrical precipitators or other dust collectors separate daily many tons of fly ash from flue gases, and my invention will be particularly described in this connection, although applicable to various other uses.

One system proposed for removal of the dust from the collecting hoppers employs special evacuating units that have water-filled receptacles to receive the ash falling from the dust collector hoppers under force of gravity. A unit of the type referred to is disclosed in patent to Thorsten et al., No. 2,370,207, dated February 27, 1945. The ash falling from the separator passes down a closed tube and is discharged into a body of water in the said unit from which it is flushed, and which serves as a seal for the bell-shaped end of said tube. One difficulty with such a system is that at times large quantities of ash or dust descend as a mass from the separator, this being especially true with electrical precipitators which are from time to time rapped or vibrated to dislodge accumulations of dust. Such a mass or avalanche of ash may clog the conduits leading from the hopper to the disposal unit, or it may discharge into the unit in excess of the capacity of the unit to handle the mass. Also, where this happens, a surge of dust-laden air may be blown into the water-filled evacuating unit and into the room, and other difficulties encountered.

In order to eliminate difficulties arising when such an avalanche of fine solids occurs, with the attendant surge in air pressure caused by the movement of the mass into the bottom of the hopper, various arrangements, such as orifice plates and star feeders have been tried at the bottoms of the hoppers, but they have failed to prevent the difficulty, and the factors of clogging, air surges, and other difficulties have not been eliminated.

According to the present invention there is provided a positive acting conveyor of the screw feed type for transferring material from the bottom of the hopper to a point of discharge into the disposal unit whereby there is a controlled maximum rate of speed of transfer of material from the hopper into the disposal unit and at the same time under all normal conditions of operation there is an effective air seal so as to prevent excessive surges of air from being transmitted from the hopper to the disposal unit. Also, there is a secondary seal provided in the system by means of such screw conveyor to prevent any back-flow of air from the disposal unit to the hopper. The conveyor unit itself is of unique construction and preferably is provided with an adjustable gate at the receiving end so as to regulate or completely cut off the volume of material which may enter the conveyor from the hopper. Additionally the conveyor is provided with means at its discharge end for agitating the material to eliminate the danger of any material packing or clogging before being delivered to the disposal unit.

By regulating the rate at which material is fed to the conveyor, and the speed of operation of the conveyor, the evacuators or disposal units never receive material at a rate in excess of the capacity of the units to handle the ash. Masses or avalanches of ash falling into the body of the hopper are disposed of at uniform rate compatible with the handling capacity of the units, and at the same time the positively acting screw conveyor will prevent the ash from blowing through the conveyor to the disposal unit. By adjusting the gate to closed position, the screw conveyor and evacuator or disposal unit may be repaired or replaced without taking the dust collector out of service.

My invention therefore provides in a system such as an ash-handling system, means for eliminating the clogging of the disposal system due to the descent of large masses of dust into the hopper, the adverse effect of any air surge created thereby, and the delivery of material to the disposal unit at a rate compatible with the capacity of the disposal unit to take care of it.

My invention additionally provides a conveyor unit of compact and unique construction having means for adjusting or cutting off the rate of delivery to it at one end, and having means to prevent the compacting of fine, solid materials therein at the other end.

My invention may be more fully understood by reference to the accompanying drawings, in which:

Fig. 2 is a longitudinal section through the feeder unit;

Figs. 3, 4 and 5 are vertical sections taken on 3—3, 4—4 and 5—5, respectively, of Fig. 2; and Fig. 6 is a fragmentary section illustrating one form of locating means that may be employed in connection with the adjustable gate of my feeder.

Figure 1:
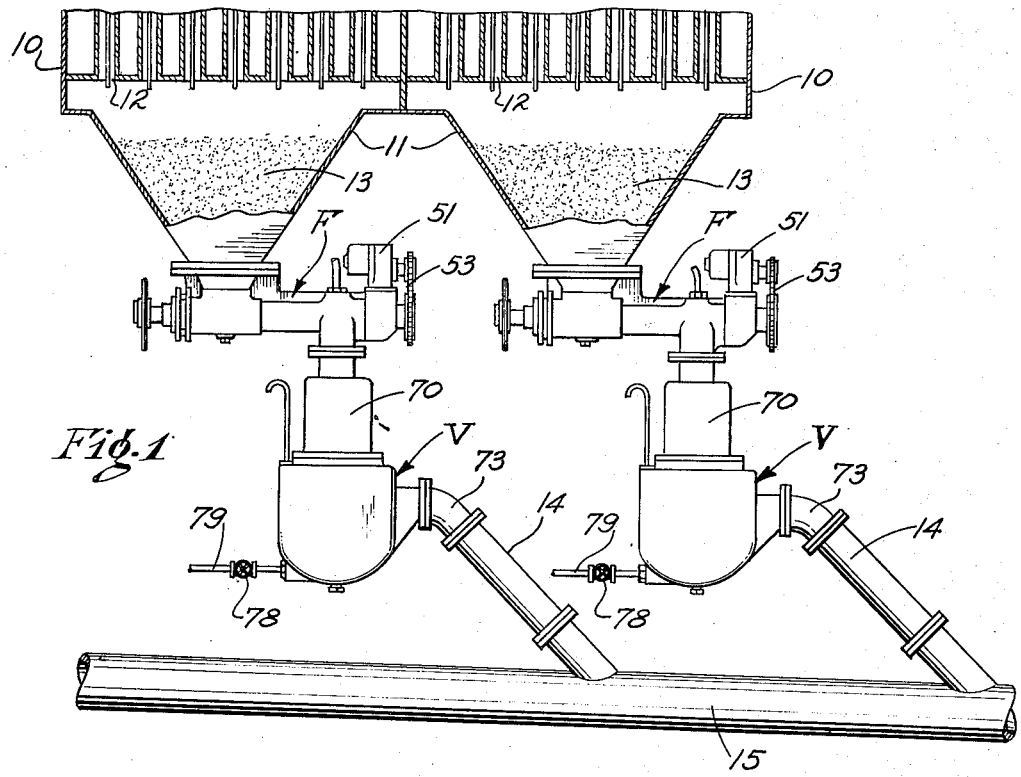
Fig. 1 is a schematic diagram of an ash disposal installation including my novel feeder.
Figures 3, 4:
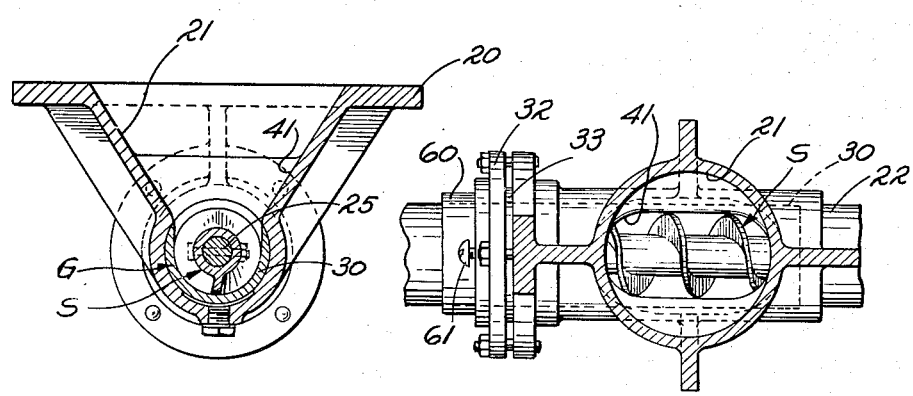

Referring to Fig. 1, in the type of system illustrated the gases leave the furnace or boiler and pass through a flue or chamber 10 which contains dust separators or precipitators which may be of any suitable construction. In one commonly employed system the flue or chamber 10 through which the gases pass contains a plurality of electrically charged elements 12 in the form of spaced plates having conductors therebetween but out of contact therewith, these elements precipitating fly ash or dust from the flue gases and dropping them into the associated hoppers 11. From the hoppers the precipitated ash 13 is drawn into one or more feeder or conveyor units F that transfer the ash or dust from the hoppers to evacuator or disposal units V to which water is supplied and in which a depth of water is normally maintained. Evacuators V discharge the ash with water through lines 14 into the main manifold 15 without destroying the draft in the flue 10.

The preferred form of feeder or conveyor illustrated in the remaining figure includes a housing 19 having a flange portion 20 for attachment to the collecting hopper. The housing has an inlet opening 21 to conduct the ash from the hopper 11 to the conveyor screw S. The screw S has a running fit with a cylindrical portion 22 of the conveyor housing and there is an outlet opening 23 in the housing in communication with the disposal unit V mounted on the conveyor by means of flange 24. The conveyor screw S is mounted on shaft 25, the sleeve 25a that supports the screw being bolted to the shaft 25 by means of bolts or other fasteners 26. At the inlet end of the screw an arcuately adjustable gate sleeve G is mounted with a sliding fit in the bore 30 in the housing of the conveyor unit. A flange 31 integral with the gate sleeve is provided for rotatably retaining the sleeve in place.

One form of retaining means that has proven satisfactory includes a gland member 32 having a cylindrical extension 33 that engages packing 34 which, in turn, urges flange 31 against the housing and so retains the sleeve G in place. Sleeve G has an inlet port 41 cooperating with inlet opening 21 in the conveyor housing to form an adjustable inlet opening. Shaft 25 is supported at one end by means of bushing 35. A second gland member 36 and suitable packing are employed to form a seal for this end of the shaft and adjusting bolts 37 may be provided to take up on the packing. This seal prevents ash from entering the bearings and insures maintenance of the draft in the precipitators which are usually maintained at sub-atmospheric pressure.

A handwheel 40 is keyed to the gate sleeve G so that when the handwheel is rotated, the effective area of opening 41 on the gate sleeve is varied to change the area of the inlet opening presented to the hopper or to completely close the bottom of the hopper. With this arrangement the amount of ash delivered by the conveyor can be simply controlled without resort to expensive variable speed transmissions or motors capable of speed regulation, and if desired, flow can be entirely cut off.

In order that the position or degree of opening of the gate valve G may be readily ascertained, and in order that it be prevented from changing, I provide any suitable indicating and locking means. For example, I may mount a collar 60 Fig. 5 on the gate sleeve G which may carry a locating screw 61 that has a pilot extension 62 Fig. 6 for entering a plurality of apertures 63 in the stationary gland member 32. As seen in Fig. 5, I provide indicating marks with the screw 61 acting as an index finger whereby the operator may determine whether or not the gate valve is opened, closed, or at some intermediate position therebetween.

At the discharge end of the conveyor an outboard bracket 45 is bolted to the flange 46 integral with the body of the conveyor, there being a pilot member 47 integral with the bracket to center it with respect to the working bore in the conveyor. Another packing gland 48 may be threaded to the bracket in order to seal the shaft 25 at the discharge end of the unit. Outboard bracket 45 includes a bearing carrier portion 49 which rotatably supports the shaft 25 by means of bushing 50. The driving motor 51 rotates the shaft 25 through gearing 52, 53 and 54 of any suitable design. The gate adjustment previously referred to permits the gearing to be of fixed ratio and the motor to be a constant speed motor which simplifies the construction. Paddle 55 rotates with the screw and prevents packing and clogging of the dust as it leaves the screw.

The feeder screw housing is designed so that the screw can be readily removed for repair or cleaning by closing the gate sleeve G, by removing bracket 45, and the sleeve G is likewise readily removed in case it suffers wears or damage from other causes. An important advantage of this construction is that the gate or sleeve G may be moved to closed position and the entire screw may then be removed for repair or replacement while the dust collector remains in operation, otherwise repair of the screw would require shutting down of the boiler.

The size and speed of the feeder can be selected to provide a steady ash input to any fluid or other type evacuating unit employed in the system within the limits of its design. Since the feeder is constantly removing material from the hopper, it is seldom that enough ash is permitted to accumulate to cause arching or clogging in the hopper itself. The adjustable gate sleeve G permits control of the delivery by the feeder and permits utilizing one feeder and drive therefor for a range of operating conditions.

As the screw will normally have some dust to operate upon, and since it has only a working clearance in the tube or housing, a positive seal is provided so that if there is a sudden drop of dust in the hopper, tending to push a surge of air through it, the air surge will be blocked. Likewise the screw when operating with dust, tends to form a seal between the evacuator and the hopper, the latter being at a sub-atmospheric pressure.

As an example of an evacuating unit which may be employed in connection with my feeder, I have shown a unit wherein a bell 70 is bolted to flange 24 of the feeder and has mounted thereon a receptacle 71 which contains a trough 72 in communication with outlet 73. A nozzle 74 is connected to a source of water and so provides a continuous influx of water. Due to the vacuum in the flue, the water level in the bell 70 rises above that in the trough 72 and retains the draft. As the ash or dust drops into the bell 70 from the conveyor it settles through the water in the bell 70 into the trough 72 and is floated away through the outlet 73 continuously. If, for any reason there is an excessive accumulation of dust or sludge in the unit, I employ means to flush the unit which includes baffle 75, nozzle 77 and valve 78 and inlet conduit 79. Valve 78, when opened for flushing, causes a surge of water to be ejected from nozzle 77 which raises the level in the trough above that of the baffle 75 wherein the outlet is sealed. When this happens a siphoning action occurs which rapidly withdraws water and sludge from the trough 72 to clear the unit.

The screw, because it acts to seal the evacuator against the sub-atmospheric pressure in the hopper, causes the column of sealing water in the bell 70 to surge up and down, producing a self-washing action on the interior of the bell which is very desirable.

Although the use of my novel feeder in a system employing fluid type evacuator units solves a problem heretofore unsolved in such systems, it is to be understood that the specific construction of the evacuating unit which may be employed in the combination with my feeder forms no part of the present invention, one aspect of the invention residing in the complete system rather than in its components. It will also be seen that the screw conveyor unit per se, with its adjustable sleeve, agitator, and screw removable through the end remote from the sleeve is a unique unit for handling dust, particularly in a system where there may be a gas pressure differential against which a seal is at times required. The conveyor also lends flexibility to the evacuator in that evacuator may be used with a hopper where its physical location under the hopper would not be practical. In other words, the evacuator may now be below, above, or at the same level as the bottom of the hopper, and the conveyor may be set at various angles to accommodate convenient placing of the evacuator.

I contemplate that various design changes within the skill of the skilled machine designer may be made in the structural parts of my feeder without departing from the essence of that aspect of the invention and although I have illustrated and described a preferred embodiment, I contemplate that the appended claims, and not the description and illustrations, be determinative of the scope of my invention.

I claim:

1. In a system for separation and disposal of gas entrained dust, the combination of a dust collecting hopper normally maintained under subatmospheric pressure to receive dust separated in said system, dust disposal means including a positively acting conveyor having its inlet connected to the outlet of said hopper, a rotatable gate surrounding the conveyor at the outlet of the hopper and having an opening for communication of dust between the hopper and inlet of the conveyor and a fluid operated evacuator having a bell at its inlet connected to the outlet of the conveyor normally containing a column of water for receiving the dust transferred from the hopper by the conveyor, and forming a gas seal for said dust disposal means, a body of water in the bottom of the evacuator outside of the bell and an opening in the evacuator to subject the body of water to atmospheric pressure, and said conveyor providing a further seal between the evacuator and the hopper to protect the evacuator against air surges caused by movement of large masses of material in the hopper.

2. In a system for separation and disposal of gas entrained dust, a chamber through which the gas passes, dust separator means in said chamber to separate the dust from the gas, a hopper to receive dust separated in said chamber, dust disposal means including a positively acting conveyor having its inlet connected to the outlet of said hopper and a fluid operated evacuator having its inlet connected to the outlet of the conveyor for receiving the dust transferred from the hopper by the conveyor, said evacuator providing a gas seal for said dust disposal means, and an adjustable gate mounted to enclose the inlet end of the conveyor having an opening arranged to provide a communication for dust between the hopper and the conveyor whereby the delivery of dust into the conveyor may be regulated to produce a substantially uniform constant discharge, the conveyor constituting the only channel of communication between the hopper and the evacuator.

3. In a system for separation and disposal of gas entrained dust, a chamber through which the gas passes, dust separator means in said chamber to separate the dust from the gas, a hopper to receive dust separated in said chamber, dust disposal means including a positively acting conveyor having inlet and outlet openings with its inlet connected to the outlet of said hopper, a fluid operated evacuator unit having its inlet connected to the outlet of the conveyor for receiving the dust transferred from the hopper by the conveyor, said evacuator providing a gas seal for dust disposal means, periodically operable dislodging means for dislodging accumulated dust in the system, and an adjustable gate mounted to enclose the inlet end of the conveyor, said gate having an opening arranged to provide a restricted communication for dust between the hopper and the conveyor.

4. A conveyor for handling fine dust or ash comprising a screw housing having inlet and outlet openings, a conveyor screw rotatable in said housing, a gate member movable in said housing and extending across said inlet, said gate member having a portion with an inner surface formed to receive said screw and concentric with the axis of the screw, said portion being apertured to provide an inlet port cooperable with said inlet opening, and means for moving said gate member to vary the effective area of the inlet opening.

5. A conveyor for handling fine dust or ash comprising a screw housing having inlet and outlet openings, a conveyor screw rotatable therein in said housing, a gate member rotatable in said housing and extending across said inlet, said gate member having a portion with an inner surface formed to receive said screw and concentric with the axis of the screw, said portion being apertured to provide an inlet port cooperable with said inlet opening, and means for rotating said gate member to vary the effective area of said inlet opening.

6. A conveyor for handling fine dust or ash comprising a screw housing having inlet and outlet openings, a conveyor screw rotatable in said housing, a cylindrical gate member rotatable in said housing having one portion extending across the inlet opening thereof and another portion extending from said housing, the inner surface of said one portion of the gate member being formed to rotatably receive said screw and being apertured adjacent said inlet opening to form an inlet port cooperable with said inlet opening, and means for rotating said gate member for varying the effective area of said inlet opening.

7. A conveyor for handling fine dust or ash comprising a screw housing and a conveyor screw rotatable therein, inlet and outlet ducts for said housing, a gate member rotatable in said housing and having a portion extending across said inlet, said portion being formed with an inner surface to receive said screw, said portion being apertured to provide an inlet port cooperable with said inlet duct, rotation of said gate member altering the effective area of the inlet duct for said screw, and a paddle member carried by said screw adjacent said outlet to prevent packing of the dust and to insure that it will fall from the conveyor under the force of gravity even though the gate member be fully open for maximum delivery of dust.

8. A screw conveyor unit comprising a tubular housing, a screw conveyor having a working fit in said housing, a rotatable gate element at one end of the housing concentric with the screw conveyor and flush with the interior of the housing, and means for adjustably holding the gate element against rotation.

9. A screw conveyor as defined in claim 8 wherein the gate element has a tubular extension, and a bearing for one end of the screw conveyor received in said extension.

10. A screw conveyor as defined in claim 9 wherein there is a hopper at one end of the housing, the throat of which opens to the screw conveyor, the said gate being movable by rotation across the throat of the hopper to close the hopper if the screw conveyor is removed.

11. A screw conveyor as defined in claim 10 wherein the housing constitutes a bearing for a rotatable gate element, the gate element and hopper having annular interfitted portions to provide a seal between the gate and housing.

12. A screw conveyor as defined in claim 11 having means for adjustably locking the gate element in adjusted position.

13. A screw conveyor as defined in claim 8 wherein the end of the housing opposite the gate has an opening in its periphery for the discharge of material therefrom and an agitator at the end of the screw conveyor rotatable therewith but spaced from the screw itself for preventing compacting of material at said end of the conveyor.

14. A screw conveyor unit for use in a dust handling system comprising a tubular housing, a screw conveyor having a working fit in said housing, an inlet in the housing adjacent one end thereof, an outlet in the housing adjacent the other end thereof, the conveyor having a shaft extension thereon adjacent the outlet, and an agitator on the extension spaced from the screw portion of the screw conveyor.

15. A screw conveyor unit comprising a tubular housing having a hopper attaching fitting at one end thereof, a rotatable gate at said end of the housing, means carried by the rotatable gate forming a shaft bearing, a screw conveyor in the housing and extending into the rotatable gate and having a shaft extension in said bearing, a removable member closing the other end of the housing and providing a bearing for the other end of the shaft, the screw conveyor being removable from the housing while the rotatable gate stays fixed by removal of said removable member whereupon the screw conveyor may be withdrawn endwise from the housing.

16. For use with a dust collector and disposal unit between which a differential pressure is maintained during operation, a screw conveyor unit for transferring dust laterally from the collector to the disposal unit comprising a screw conveyor, a housing for the screw conveyor in which the screw conveyor has a working clearance, and an apertured sleeve in a portion of the housing near one end of the unit concentric with the screw and movable in an arc about the axis of the screw for adjusting the rate of delivery of material from the collector to the unit whereby the feeding of dust may be regulated to keep the screw substantially uniformly loaded with dust so as to utilize the dust in maintaining a seal through the conveyor from the collector to the disposal units, and means accessible at one end of the housing for so adjusting said sleeve.

THORLEIF THORSTEN.

References Cited in the file of this patent

UNITED STATES PATENTS

| Number | Name | Date |
|---|---|---|
| 1,668,324 | Kreisinger | May 1, 1928 |
| 1,737,090 | Meyers | Nov. 26, 1929 |
| 1,862,752 | Jones | June 14, 1932 |
| 1,867,245 | Bailey | July 12, 1932 |
| 2,344,347 | Foresman | Mar. 14, 1944 |
| 2,370,207 | Thorsten | Feb. 27, 1945 |
| 2,421,977 | Allen | June 10, 1947 |

FOREIGN PATENTS

| Number | Country | Date |
|---|---|---|
| 752,201 | France | Sept. 19, 1933 |
| 488,160 | Great Britain | July 1, 1938 |